United States Patent
Chin et al.

(10) Patent No.: US 11,706,801 B2
(45) Date of Patent: Jul. 18, 2023

(54) METHOD OF LISTEN BEFORE TALK RECOVERY PROCEDURE AND RELATED DEVICE

(71) Applicant: FG Innovation Company Limited, Tuen Mun (HK)

(72) Inventors: Heng-Li Chin, Taipei (TW); Hsin-Hsi Tsai, Taipei (TW); Mei-Ju Shih, Taipei (TW); Chia-Hung Wei, Taipei (TW)

(73) Assignee: FG Innovation Company Limited, Tuen Mun (HK)

(*) Notice: Subject to any disclaimer, the term of this patent is extended or adjusted under 35 U.S.C. 154(b) by 0 days.

(21) Appl. No.: 17/093,044

(22) Filed: Nov. 9, 2020

(65) Prior Publication Data

US 2021/0144761 A1    May 13, 2021

Related U.S. Application Data

(60) Provisional application No. 62/932,198, filed on Nov. 7, 2019, provisional application No. 62/934,673, filed on Nov. 13, 2019.

(51) Int. Cl.
*H04W 74/08* (2009.01)
*H04W 72/0453* (2023.01)
(Continued)

(52) U.S. Cl.
CPC ... *H04W 74/0808* (2013.01); *H04W 36/0079* (2018.08); *H04W 36/305* (2018.08); *H04W 72/042* (2013.01); *H04W 72/0453* (2013.01)

(58) Field of Classification Search
CPC ..... H04W 24/04; H04W 28/04; H04W 36/06; H04W 36/24; H04W 36/36;
(Continued)

(56) References Cited

U.S. PATENT DOCUMENTS

| 11,284,433 | B2 * | 3/2022 | Jang | H04W 74/0833 |
| 2020/0106573 | A1 * | 4/2020 | Cirik | H04W 74/0833 |

(Continued)

FOREIGN PATENT DOCUMENTS

| CN | 109565717 A | 4/2019 |
| WO | 2019/031796 A1 | 2/2019 |

OTHER PUBLICATIONS

Mediatek Inc., "On consistent LBT failures", R2-1913260, 3GPP TSG-RAN WG2 Meeting #107bis, Chongqing, China, Oct. 14-18, 2019.

(Continued)

*Primary Examiner* — Kan Yuen
(74) *Attorney, Agent, or Firm* — ScienBiziP, P.C.

(57) ABSTRACT

A method of listen before talk (LBT) recovery procedure for a user equipment (UE) is provided. The method comprises performing an LBT failure detection procedure for a serving cell, triggering the LBT recovery procedure for the serving cell in response to detecting consistent uplink (UL) LBT failures in a first bandwidth part (BWP) on the serving cell according to the LBT failure detection procedure, where the LBT recovery procedure includes triggering an LBT failure procedure for determining the first BWP as an invalid BWP, and cancelling the triggered LBT recovery procedure for the serving cell in response to confirming a predefined condition in the UE.

10 Claims, 5 Drawing Sheets

(51) Int. Cl.
*H04W 36/30* (2009.01)
*H04W 36/00* (2009.01)
*H04W 72/04* (2023.01)

(58) Field of Classification Search
CPC ........... H04W 36/305; H04W 36/0079; H04W 72/0453; H04W 72/042; H04W 72/23; H04W 74/0808; H04W 74/0833; H04W 76/18; H04W 76/19; H04L 41/06; H04L 41/0681
See application file for complete search history.

(56) References Cited

U.S. PATENT DOCUMENTS

| | | | | |
|---|---|---|---|---|
| 2020/0154480 | A1* | 5/2020 | Jose | H04W 72/02 |
| 2020/0204333 | A1* | 6/2020 | Agiwal | H04W 76/27 |
| 2021/0007146 | A1* | 1/2021 | Agiwal | H04W 74/0808 |
| 2021/0045031 | A1* | 2/2021 | Lee | H04W 36/22 |
| 2021/0100031 | A1* | 4/2021 | Cirik | H04W 76/19 |
| 2021/0168862 | A1* | 6/2021 | Murray | H04W 74/0816 |
| 2022/0346174 | A1* | 10/2022 | Wang | H04W 74/0808 |
| 2022/0394763 | A1* | 12/2022 | Wang | H04W 74/0808 |

OTHER PUBLICATIONS

Interdigital, "Handling UL LBT Failures in MAC", R2-1912889, Revision of R2-1909604, 3GPP RAN WG2 Meeting #107bis, Chongqing, China, Oct. 14-18, 2019.
Spreadtrum Communications, "Consideration of LBT failure in NR-U", R2-1900937, 3GPP TSG-RAN WG2 Meeting #105, Athens, Greece, Feb. 25-Mar. 1, 2019.
3GPP TS37.340 V15.7.0 (Sep. 2019); 3GPP Technical Specification Group Radio Access Network; E-UTRA and NR; Multi-connectivity; stage 2 (Release 15); 650 Route des Lucioles-Sophia Antipolis Valbonne—France.
3GPP TS38.321 V15.7.0 (Sep. 2019); 3GPP Technical Specification Group Radio Access Network; NR; Medium Access Control (MAC) protocol specification (Release 15); 650 Route des Lucioles-Sophia Antipolis Valbonne—France.
3GPP TS38.331 V15.7.0 (Sep. 2019); 3GPP Technical Specification Group Radio Access Network; NR; Radio Resource Control (RRC) protocol specification (Release 15); 650 Route des Lucioles-Sophia Antipolis Valbonne—France.
3GPP TR38.889 V16.0.0 (Dec. 2018); 3GPP Technical Specification Group Radio Access Network; Study on NR-based access to unlicensed spectrum (Release 16); 650 Route des Lucioles-Sophia Antipolis Valbonne—France.

* cited by examiner

METHOD OF LISTEN BEFORE TALK RECOVERY PROCEDURE AND RELATED DEVICE

CROSS-REFERENCE TO RELATED APPLICATION(S)

The present disclosure claims the benefit of and priority to U.S. provisional Patent Application Ser. No. 62/932,198 filed on Nov. 7, 2019, entitled "Method and apparatus to handle LBT failure recovery procedure," (hereinafter referred to as "the '198 provisional") and U.S. provisional Patent Application Ser. No. 62/934,673 filed on Nov. 13, 2019, entitled "Method and apparatus to handle completion of LBT failure recovery procedure," (hereinafter referred to as "the '673 provisional"). The disclosure of the '198 provisional and '673 provisional are hereby incorporated fully by reference into the present disclosure.

FIELD

The present disclosure generally relates to wireless communications, and more specifically, to a method of listen before talk (LBT) recovery procedure and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of listen before talk (LBT) recovery procedure and a related device.

According to an aspect of the present disclosure, a method of LBT recovery procedure for a user equipment (UE) is provided. The method comprises performing an LBT failure detection procedure for a serving cell, triggering the LBT recovery procedure for the serving cell in response to detecting consistent uplink (UL) LBT failures in a first bandwidth part (BWP) on the serving cell according to the LBT failure detection procedure, where the LBT recovery procedure includes triggering an LBT failure procedure for determining the first BWP as an invalid BWP, and cancelling the triggered LBT recovery procedure for the serving cell in response to confirming a predefined condition in the UE.

According to another aspect of the present disclosure, a UE for performing an LBT recovery procedure is provided. The UE comprises a processor, for executing computer-executable instructions, and a non-transitory computer-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DESCRIPTION

Figure 1:
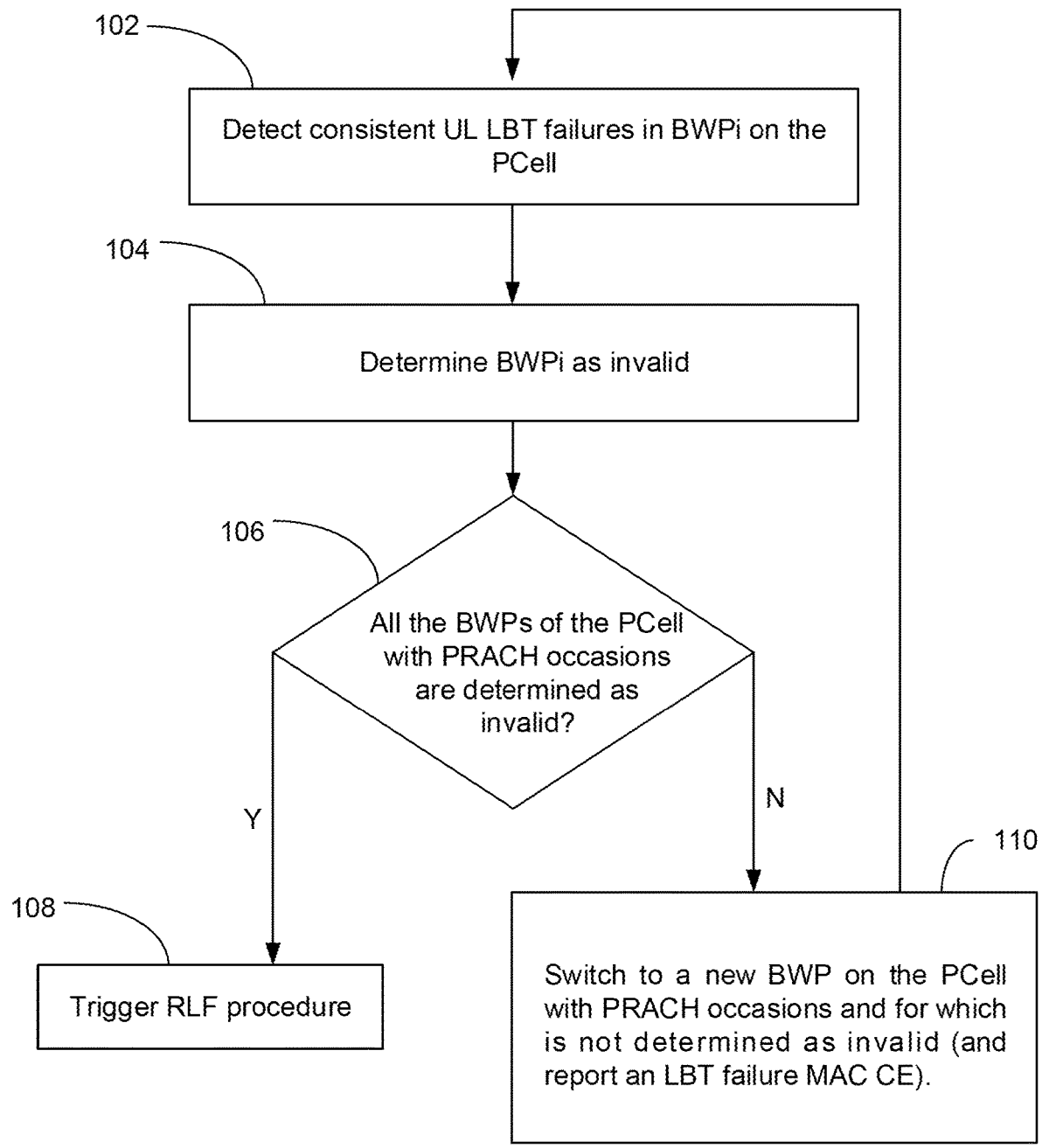
FIG. 1 is a schematic diagram illustrating an LBT recovery procedure on a Primary Cell (PCell), according to an implementation of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or an NR system) may typically include at least one base station (B S), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC)

code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided via an NR frame to support ProSe services or V2X services.

NR Radio Access operating in Unlicensed Spectrum (referred to as NR-U) has been introduced in the 3GPP specification and may enable fair coexistence between already deployed Wi-Fi generations and NR-U, between NR-U and LTE Licensed Assisted Access (LAA), between different NR-U systems, etc.

Configured grant Type 1 and Type 2 are defined in NR system. These two types of configured grant are also included in NR-U. For the retransmission of a HARQ process that is initially transmitted via a configured uplink grant resource, both retransmission via the same configured uplink grant resource and retransmission via a resource scheduled by UL grant are supported.

In an unlicensed spectrum, a UE may perform channel access before performing a transmission in order to make sure there is no other device occupying the channel via which the transmission is intended to be performed. For channel access in NR-U, an Listen Before Talk (LBT) failure detection procedure may be adopted as baseline for 5 GHz band and adopted as the starting point of the design for 6 GHz band. For NR-U LBT failure detection procedure, a UE may perform the LBT failure detection procedure with one of the 4 LBT categories before performing an UL transmission for different transmissions in a Channel Occupancy Time (COT) (as defined below) and different channels/signals to be transmitted. Specifically, a UE may perform an LBT failure detection procedure by using different LBT categories before performing random access channel (RACH), physical uplink control channel (PUCCH), physical uplink shared channel (PUSCH) and sounding reference signal (SRS) transmissions.

Category 1: immediate transmission after a short switching gap

LBT Category 1 may be used for a transmitter to immediately transmit after a switching gap inside a COT. More specifically, the switching gap from reception to transmission is to accommodate the transceiver turnaround time and is no longer than 16 μs. Note that Category 1 may also be known as Type 2 UL channel access procedure.

Category 2: LBT without random back-off

For LBT category 2, the duration of time that the channel (via which transmission is intended to be performed) is detected to be idle before the transmitting entity transmits is deterministic. Note that Category 2 may also be known as Type 2 UL channel access procedure.

Category 3: LBT with random back-off with a contention window of fixed size

LBT category 3 may include the following components. A transmitting entity draws a random number N within a contention window. The size of the contention window is specified by the minimum and maximum value of N. The size of the contention window is fixed. The random number N is used in the LBT category 3 to determine the duration of time that the channel (via which transmission is intended to be performed) is determined to be idle before the transmitting entity transmits on the channel.

Category 4: LBT with random back-off with a contention window of variable size

LBT category 4 includes the following components. A transmitting entity draws a random number N within a contention window. The size of contention window is specified by the minimum and maximum value of N. The transmitting entity can vary the size of the contention window when drawing the random number N. The random number N is used in the LBT category 4 to determine the duration of time that the channel (via which transmission is intended to be performed) is determined to be idle before the transmitting entity transmits on the channel. Note that Category 4 may also be known as Type 1 UL channel access procedure.

NR-U can be operated in a PCell, an SCell, or a PSCell. In stand-alone mode, all cells are in unlicensed spectrum. When SCells are in unlicensed spectrum, the PCell may be in licensed spectrum. An NR-U SCell may or may not be configured with UL. The DC-type of operation can be configured either with E-UTRAN node (connected to EPC or 5GC) as master node (MN) or with NR node.

The gNB and a UE may apply the LBT failure detection procedure (on a serving cell) before performing an UL transmission (on the serving cell). When the LBT failure detection procedure is performed (on the serving cell), the transmitter listens to the channel to determine whether the channel is free or busy (on the serving cell) and performs transmission (on the serving cell) only if the channel is sensed free.

An LBT failure detection procedure may be applied to any type of UL transmission. The LBT failure detection procedure of a BWP/serving cell/cell group may be used to count the number of LBT failures of the BWP/serving cell/cell group.

When the UE detects consistent UL LBT failures on a SCell, the UE may report the consistent UL LBT failures (via a MAC CE) to the corresponding gNB (MN for MCG, or secondary node (SN) for SCG). When the UE detects consistent UL LBT failures on a BWP of a SpCell, the UE may trigger an LBT recovery procedure on the SpCell. The LBT recovery procedure on the SpCell may involve switching to a new BWP on the SpCell where consistent UL LBT failures has not been detected, and for which PRACH occasion has been configured, and initiates a Random Access (RA) procedure on the new BWP. When multiple BWPs are available for switching (e.g., each of the multiple BWPs has not detected consistent UL LBT failures and a PRACH occasion has been configured), the UE may determine which one to select. On the other hand, for a PSCell, if there is no available BWP for BWP switching (e.g., consistent UL LBT failures are detected in the switched BWP) during the LBT recovery procedure, the UE may trigger a SCG radio link failure (RLF) procedure and reports the LBT failure to the MN. For a PCell, if consistent UL LBT failures are detected, the UE may trigger an RLF procedure.

An UL transmission (on a serving cell) may be performed by the UE only if no LBT failure is detected (e.g., under an LBT category mentioned above) according to the LBT failure detection procedure (on the serving cell). Moreover, if no LBT failure is detected for the UL transmission (on a serving cell), the maximum continuous (UL) transmission time may be predetermined by a Maximum Channel Occupancy Time (MCOT) value. The UE may perform the UL transmission (on the serving cell) within a period defined by the MCOT without performing the LBT failure detection procedure (on the serving cell).

More specifically, the UE may determine that no LBT failure is detected if the channel is detected to be idle (e.g., a power detected by the UE to perform an UL transmission is less than a predetermined/configured power threshold) in a predetermined/configured duration of time (e.g., via the LBT category 2/3/4). Otherwise, the UE may determine that an UL LBT failure is detected. In addition, the Medium Access Control (MAC) entity may receive an LBT failure indication from the Physical (PHY) layer when an UL LBT failure is detected. The LBT failure indication may be used for incrementing an LBT counter (e.g., LBT_COUNTER).

An LBT failure indication may delay the UL transmission because it implies that the UE must transmit or retransmit data on the subsequent UL resource(s). It is noted that some of the UL transmissions may be initiated by a UE, via Contention Based Random Access (CBRA), Scheduling Request (SR), a configured uplink grant resource, etc. Hence, a network may not be aware if the UE fails to perform the UL transmission due to the LBT failure. Moreover, the network may not be able to predict the UL channel condition from the UE's perspective due to hidden node (e.g., the network may not be aware of another device in the vicinity of a UE that also performs a UL transmission). Therefore, the network may not be able to prevent the UE, via configuration/indication, from suffering an LBT failure in time. To address this issue, a UL LBT recovery procedure is introduced to handle the LBT failure in NR-U system. The LBT recovery procedure may be triggered by the UE for the LBT failure in order to prevent delay of UL transmissions.

A counter (e.g., LBT_COUNTER), a timer (lbt-FailureDetectionTimer), and a threshold (e.g., lbt-FailureInstanceMaxCount) is used for the LBT failure detection procedure. Moreover, the LBT_COUNTER, lbt-FailureDetectionTimer, and lbt-FailureInstanceMaxCount may be configured/maintained per BWP/cell/cell group/subset of cell group.

The LBT_COUNTER (of a serving cell) may be initially set to zero upon (re-)configuration and may be incremented by the UE when detecting an UL LBT failure or when an LBT failure indication is received from the PHY layer according to the LBT failure detection procedure (of the serving cell). More specifically, one UL LBT failure may be caused by any (or specific) UL transmission type. That is, the LBT_COUNTER (of a serving cell) may be incremented when any (or specific) type of UL transmissions cannot be performed (on the serving cell). In one embodiment, the LBT_COUNTER (of a serving cell) may be increased by one for each UL LBT failure detected by the UE (on the serving cell) according to the LBT failure detection procedure.

The lbt-FailureDetectionTimer (of a serving cell) may be configured by the network to the UE. lbt-FailureDetectionTimer (of a serving cell) may be started or restarted when any (or specific) type of UL transmission cannot be performed (on the serving cell). Alternatively, the lbt-FailureDetectionTimer (of the serving cell) may be (re)started by the UE whenever the LBT_COUNTER (of the serving cell) is incremented. The LBT_COUNTER (of the serving cell) may be reset (e.g., set to zero) when the lbt-FailureDetectionTimer (of the serving cell) expires.

If LBT_COUNTER (of a serving cell) reaches lbt-FailureInstanceMaxCount (of a BWP of the serving cell), it implies that consistent UL LBT failures are detected (in the BWP of a serving cell). Consequently, an LBT recovery procedure (of the serving cell) may be triggered by the UE.

FIG. 1 is a schematic diagram illustrating an LBT recovery procedure on a PCell, according to an implementation of the present disclosure. As illustrated in FIG. 1, if consistent UL LBT failures are detected in a BWP on a PCell according to the LBT failure detection procedure on the PCell (e.g., LBT_COUNTER reaches lbt-FailureInstanceMaxCount for the corresponding BWP of the PCell) (action 102), the UE may trigger a LBT recovery procedure on the PCell, which involves triggering an LBT failure procedure for the BWP to determine the BWP as invalid (action 104). Moreover, the UE may determine whether an LBT failure procedure is triggered for all BWPs with PRACH occasions of the PCell (e.g., whether all the BWPs of the PCell with PRACH occasions are determined as invalid) (e.g., action 106). If not, the UE may, as part of the LBT recovery procedure, switch to a new BWP on the PCell with a PRACH occasion and for which is not determined as invalid (e.g., action 110). Additionally, an LBT failure MAC CE that indicates the invalid BWP/Cell or BWP/Cell that indicated LBT failure may be transmitted to the network as part of the LBT recovery procedure on the PCell (e.g., action 110). However, if all the BWPs on the PCell with a PRACH occasion are determined as invalid (or a BWP_declaration_counter has reached a configured BWP_declaration_threshold), the UE may trigger an RLF procedure (e.g., action 108).

Figure 2:
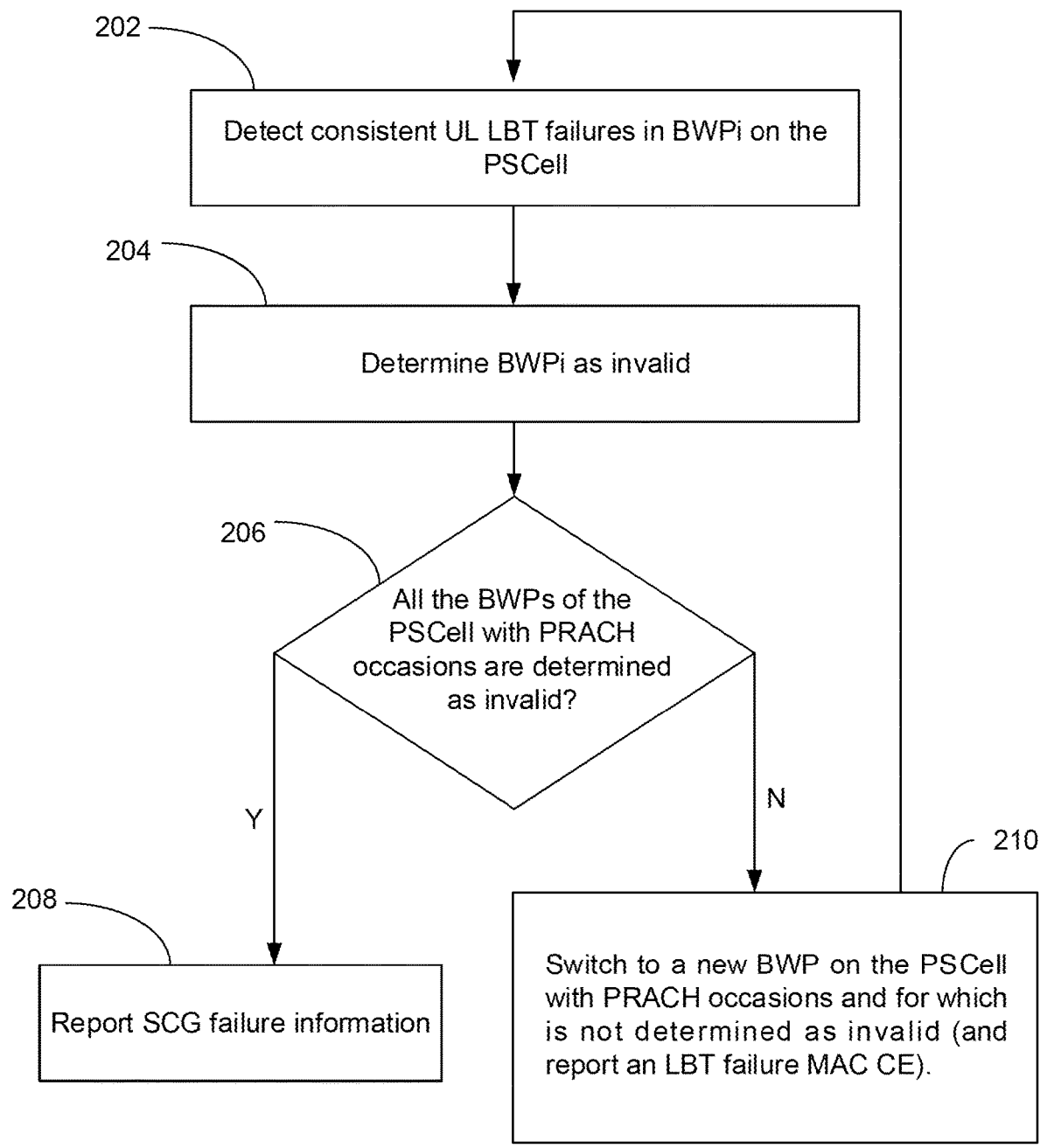
FIG. 2 is a schematic diagram illustrating an LBT recovery procedure on a Primary Secondary Cell Group (SCG) Cell (PSCell), according to an implementation of the present disclosure.

FIG. 2 is a schematic diagram illustrating an LBT recovery procedure on a PSCell, according to an implementation of the present disclosure. As illustrated in FIG. 2, if consistent UL LBT failures are detected in a BWP on a PSCell according to the LBT failure detection procedure on the PSCell (e.g., LBT_COUNTER reaches lbt-FailureInstanceMaxCount for the corresponding BWP of the PSCell) (action 202), the UE may trigger an LBT recovery procedure on the PSCell, which involves triggering an LBT failure procedure for the BWP to determine the BWP as invalid (action 204). Moreover, the UE may determine whether an LBT failure procedure is triggered for all BWPs with PRACH occasions of the PSCell (e.g., whether all the BWPs of the PSCell with PRACH occasions are determined as invalid) (e.g., action 206). If not, the UE may, as part of the LBT recovery procedure, switch to a new BWP on the PSCell with a PRACH occasion and for which is not determined as invalid (e.g., action 210). Additionally, an LBT failure MAC CE that indicates the invalid BWP/Cell or BWP/Cell that indicated LBT failure may be transmitted to the network as part of the LBT recovery procedure on the PSCell (e.g., action 210). However, if all the BWPs on the PSCell with a PRACH occasion are determined as invalid (or a BWP_declaration_counter has reached a configured BWP_declaration_threshold), the UE may report SCG failure information to the network (e.g., action 208).

In one implementation, a BWP_declaration_counter may be initially set to zero upon (re-)configuration. The BWP_declaration_counter may be maintained per cell (or per cell group/subset of cell group) in order to count the number of BWPs that have been detected with consistent UL LBT failures for the corresponding cell. The BWP_declaration_counter (corresponds to a serving cell) may be incremented by '1' each time when a BWP (of a serving cell) is determined as an invalid BWP (e.g., consistent UL LBT failures occur on the BWP of a serving cell).

On the other hand, a BWP_declaration_threshold may be configured per cell (or per cell group/subset of cell group). The threshold may be used to define the maximum number of BWPs (of a serving cell) that are determined as invalid BWPs before the UE triggers an RLF procedure or report SCG failure information as part of the LBT recovery procedure.

In one example, if the value of BWP_declaration_counter (corresponds to the PCell) has reached a BWP_declaration_threshold for the PCell, the UE may trigger an RLF procedure.

In one implementation, if the value of BWP_declaration_counter (corresponds to the PSCell) has reached a BWP_declaration_threshold for the PSCell, the UE may report SCG failure information.

In an example, the BWP_declaration_threshold configured for a serving cell may be configured to be equal to the number of BWPs configured with a PRACH occasion of the serving cell.

In another example, if consistent UL LBT failures are detected in a BWP on a SCell according to the LBT failure detection procedure on the SCell (e.g., LBT_COUNTER reaches lbt-FailureInstanceMaxCount for the corresponding BWP), an LBT recovery procedure on the SCell may involve triggering LBT failure procedure on the BWP to determine the BWP as invalid and transmitting an LBT failure MAC CE (which identifies the failed cell and/or BWP) to the network.

Figure 3:
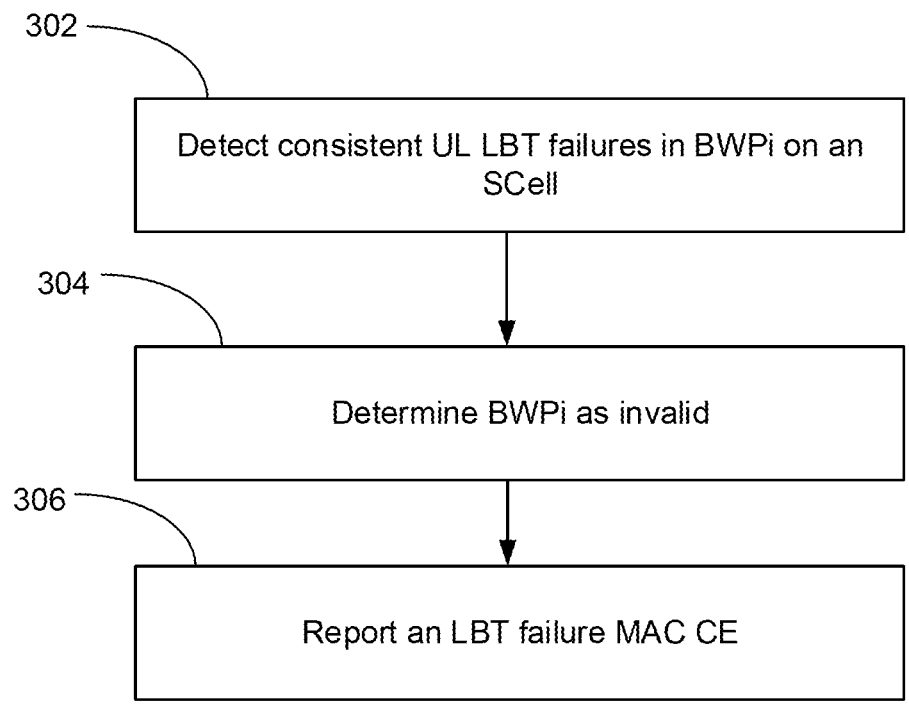
FIG. 3 is a schematic diagram illustrating an LBT recovery procedure on a Secondary Cell (SCell), according to an implementation of the present disclosure.

FIG. 3 is a schematic diagram illustrating an LBT recovery procedure on a SCell, according to an implementation of the present disclosure. As illustrated in FIG. 3, the UE may report an LBT failure MAC CE (action 306) after triggering an LBT failure procedure for a BWP on the SCell to determine the BWP on the SCell as invalid) (action 304). Moreover, the UE may trigger the LBT failure procedure for the BWP (e.g., determine the BWP on the SCell as invalid) as part of the LBT recovery procedure after detecting consistent UL LBT failures on the BWP of the SCell according to the LBT failure detection procedure on the SCell (action 302).

In an example, the triggered LBT failure procedure may be considered as pending until it is being cancelled. Subsequently, if an UL resource (e.g., PUSCH) becomes available for the transmission of an LBT failure MAC CE, the UE may generate an LBT failure MAC CE if there is triggered and pending LBT failure procedure. The generated LBT failure MAC CE may include information of the BWP(s) and/or serving cell(s) where LBT failure procedure has been triggered (e.g., after detecting consistent UL LBT failures). Alternatively, the generated LBT failure MAC CE may include information of the serving cell(s) that has invalid BWP(s).

In an example, the indicated LBT failure prior to MAC PDU assembly may be cancelled for a BWP(s) and/or serving cell(s) when a MAC PDU is transmitted, and this MAC PDU includes an LBT failure MAC CE (with a corresponding subheader) that includes LBT information of the BWP(s) and/or serving cell(s).

In another example, all the indicated LBT failure (s) prior to MAC PDU assembly may be cancelled when a MAC PDU is transmitted, and this MAC PDU includes an LBT failure MAC CE (with a corresponding subheader) that includes LBT information of all the BWP(s) and/or serving cell(s).

In one implementation, a BWP/cell for which LBT failure procedure is triggered may be determined as an invalid BWP/cell.

In one implementation, a BWP/cell for which a triggered LBT failure procedure is canceled may be determined as an valid BWP/cell.

In one implementation, a BWP/cell that is determined as an invalid BWP/cell may be equivalent to the BWP/cell for which an LBT failure procedure is triggered. On the other hand, an invalid BWP/cell that is reconsidered/determined as a valid BWP/cell may be equivalent to the BWP/cell for which the triggered LBT failure procedure is canceled.

In one implementation, after triggering LBT failure procedure for a BWP/cell, the UE may determine the BWP/cell as an invalid BWP/cell. On the other hand, after cancelling the triggered LBT failure procedure for a BWP/cell, the UE may determine the BWP/cell as a valid BWP/cell.

For an LBT recovery procedure on a PCell or PSCell, when the UE detects consistent UL LBT failures in a BWP, the BWP may be determined by the UE as an invalid BWP. In this case, the UE may be prohibited from switching to the invalid BWP (e.g., a UE-initiated BWP switching). In other words, when the UE performs BWP switching as part of the LBT recovery procedure on the PCell or PSCell, the UE may be restricted from switching to the invalid BWP. Moreover, there is no conditions or time to release the BWP switching prohibition even if the channel condition may be varied over time. Consequently, the UE may have no choice but triggers the RLF procedure (for an LBT recovery procedure on a PCell) or reports SCG failure information (for an LBT recovery procedure on a SCell) when all the BWPs configured with a PRACH occasion are determined as invalid, regardless of the actual channel conditions (e.g., idle or busy).

In one example, a UE is configured with the BWP1 and BWP2 on the PCell, and the BWP1 and BWP2 are configured with PRACH occasions. When consistent UL LBT failures are detected in the BWP1, the UE may determine BWP1 as an invalid BWP and therefore switches to the BWP 2 (and may initiate RA procedure after switching to BWP2) as part of the LBT recovery procedure on the PCell. Subsequently, the UE may be restricted from switching back to the BWP1 even if the BWP1 is no longer occupied by any other competing devices. As a result, the UE may have no other choice but triggers an RLF procedure.

To solve the above-mentioned issues, a condition-based approach that introduces conditions for a UE to cancel the triggered LBT failure procedure on the BWP (e.g., determine an invalid BWP as a valid BWP), is disclosed. Alternatively, a timer-based approach that allows a UE to switch to a BWP, which is as part of an LBT recovery procedure, when the BWP that was determined as invalid becomes valid again upon expiration of a timer, is also disclosed.

Condition-Based Approach

As mentioned above, a UE may trigger LBT failure procedure for the BWP (e.g., determine a BWP as an invalid BWP), if consistent UL LBT failures are detected in this BWP. As a result, the UE may neither switch to an invalid BWP nor switch to a BWP with indicated LBT failure. However, the BWP that has been determined by the UE as invalid may be reconsidered as valid (e.g., triggered LBT failure procedure at the BWP may be cancelled). Besides, the value of BWP_declaration_counter, which counts the number of BWPs that have been determined as invalid BWPs for a serving cell, may be reset.

In one implementation, the UE may cancel the triggered LBT failure procedure for the BWP (e.g., determine an invalid BWP as a valid BWP) if at least one of the following conditions is satisfied.

Condition 1: the UE determines an invalid BWP as a valid BWP if a BWP switching command is received from a network In some examples, the BWP switching command may be signaled via downlink control information (DCI) message (e.g., signaled on a PDCCH for BWP switching). In some examples, the BWP switching command may be a dynamic grant that schedules an UL or DL resource on another BWP.

In one implementation, when the UE receives a BWP switching command for a serving cell, all the invalid BWPs on the serving cell are reconsidered as valid BWPs and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

In one implementation, when the UE receives a dynamic grant that indicates an UL resource on a BWP that is determined as invalid, the UE may switch to the corresponding BWP and reconsidered this BWP as a valid BWP.

In one implementation, when the UE receives a dynamic grant that indicates an UL resource on a BWP that is determined as invalid, the UE may switch to the corresponding BWP and reconsidered this BWP as a valid BWP only if the BWP is pre-configured with a specific Information Element (IE). The IE may be but is not limited to be configured by the gNB with BWP basis. Via the IE, the gNB may explicitly indicate the UE whether an invalid BWP can be reconsidered as valid BWP while receiving a UL grant on the BWP.

Condition 2: the UE determines an invalid BWP as a valid BWP during an RA procedure In one implementation, when the UE initiates an RA procedure on a serving cell (e.g., due to no PRACH occasions configured on the current BWP), the UE may switch to a BWP indicated by initialUplinkBWP if there is no PRACH occasions configured on the UE's current BWP of the serving cell.

In one implementation, when the UE switches to the BWP indicated by initialUplinkBWP of a serving cell during an RA procedure, the BWP indicated by initialUplinkBWP may be reconsidered as valid (e.g., the BWP indicated by initialUplinkBWP is determined as invalid due to consistent UL LBT failures being detected in this BWP).

In one implementation, when the UE switches to the BWP indicated by initialUplinkBWP of a serving cell during an RA procedure, all the invalid BWPs on the serving cell are reconsidered as valid BWPs and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

Condition 3: the UE determines an invalid BWP as a valid BWP if the BWP-InactivityTimer Expires In one implementation, when the bwp-InactivityTimer associated with the active DL BWP of a serving cell expires, and the UE performs BWP switching to a BWP indicated by the defaultDownlinkBWP-Id or performs BWP switching to the initialDownlinkBWP, all the invalid BWPs on the serving cell are reconsidered as valid BWPs and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

Condition 4: the UE determines an invalid BWP as a valid BWP if an indication that indicates a BWP is valid or all BWPs are valid is received from a network In some examples, the indication may be signaled via DCI message. In some examples, the indication may be signaled via (DL) MAC CE. In some examples, the indication may be signaled via radio resource control (RRC) signaling.

In one embodiment, the network may indicate, via DCI message/MAC CE/RRC signaling, one or more BWPs that a UE shall reconsider as valid BWPs. Upon reception of such an indication from the network, the UE may reconsider the corresponding BWPs (as indicated by the network) to be valid BWPs and/or reset BWP_declaration_counter (corresponding to the serving cell) to '0'. It is noted that the network may identify which BWP(s) are determined as invalid by the UE (e.g., the BWP(s) where consistent UL LBT failures are detected by the UE) prior to provide the indication to the UE.

In one implementation, the network may indicate, via a type of (DL) MAC CE one or more configured (UL) BWPs that the UE may reconsider as valid BWPs. In one example, the MAC CE includes a bitmap, each bit within the bitmap referring to a BWPs configured to the UE. In addition, a bit set to '0' or '1' may indicate that the UE shall consider the corresponding BWP as a valid BWP.

Condition 5: the UE determines an invalid BWP as a valid BWP if an RRC configuration message or RRC reconfiguration message is received In some examples, the RRC (re-)configuration message may configure or reconfigure a BWP for a serving cell.

In some examples, the RRC (re-)configuration message may configure or reconfigure the firstActiveDownlinkBWP-Id and/or firstActiveUplinkBWP-Id for a SpCell.

In one implementation, when the UE receives an RRC (re-)configuration message to configure or reconfigure a BWP for a serving cell, this BWP may be reconsidered as valid.

In one implementation, when the UE receives an RRC (re-)configuration message to configure or reconfigure a BWP for a serving cell, all BWPs that were considered as invalid (e.g., consistent UL LBT failures are detected in those BWPs) may be reconsidered as valid BWPs and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

Condition 6: the UE determines an invalid BWP as a valid BWP if a serving cell is activated or deactivated In one example, an SCell may be deactivated when sCellDeactivationTimer configured for this SCell expires.

In one example, an SCell may be activated or deactivated by a SCell Activation/Deactivation MAC CE.

In one implementation, when a serving cell is deactivated, all the BWPs that were determined as invalid (e.g., consistent UL LBT failures are detected in those BWPs) may be reconsidered as valid and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

In one implementation, when a serving cell is activated, all the BWPs that were considered invalid (e.g., consistent UL LBT failures are detected in those BWPs) may be reconsidered as valid and/or the BWP_declaration_counter (corresponding to the serving cell) may be reset to '0'. Moreover, the triggered LBT recovery procedure on the serving cell may be cancelled because the triggered LBT failure procedure in all BWPs on the serving cell are cancelled or all the invalid BWPs on the serving cell are reconsidered as valid.

In one example, an initial state of the BWPs of a serving cell is considered as valid when the serving cell (or the BWP) is activated (or deactivated).

Condition 7: the UE determines an invalid BWP as a valid BWP if a specific type of RA procedure is successful/unsuccessful completed It is noted that the specific type of RA procedure may be referred to as a UE-initiated RA procedure (e.g., the RA procedure initiated by a UE is considered as a part of an LBT recovery procedure (e.g., on the PCell or PSCell).

In one implementation, an LBT recovery procedure may be triggered on a PCell when consistent UL LBT failures are detected in a BWP of the PCell, which may involve triggering an LBT failure procedure for the BWP of the PCell (e.g., determining the BWP as an invalid BWP). Moreover, the LBT recovery procedure on the PCell may involve initiation of a RA procedure on a new BWP configured with a PRACH occasion and the BWP not being determined as invalid on the PCell. Subsequently, when the RA procedure is (successfully/unsuccessfully) completed on the new BWP, all the BWPs configured on the PCell that were determined as invalid (e.g., consistent UL LBT failures are detected in those BWPs) are reconsidered as valid (e.g., all the BWPs become a candidate for BWP switching) and/or the BWP_declaration_counter (corresponding to the PCell) may be reset to '0'. Moreover, the triggered LBT recovery procedure on the PCell may be cancelled because the triggered LBT failure procedure in all BWPs on the serving cell are cancelled or all the invalid BWPs on the PCell are reconsidered as valid.

In one implementation, an LBT recovery procedure may be triggered on the PSCell when consistent UL LBT failures are detected in a BWP on the PSCell, which may involve triggering an LBT failure procedure for the BWP (e.g., determining the BWP as an invalid BWP). Moreover, the LBT recovery procedure on the PSCell may involve initiation of an RA procedure on a new BWP configured with a PRACH occasion and the BWP not being determined as invalid on the PSCell. Subsequently, when the RA procedure is (successfully/unsuccessfully) completed on the new BWP, all the BWPs configured on the PSCell that were determined as invalid (e.g., consistent UL LBT failures are detected in those BWPs) are reconsidered as valid (e.g., a candidate for BWP switching) and/or the BWP_declaration_counter (corresponding to the PSCell) may be reset to '0'. Moreover, the triggered LBT recovery procedure on the PSCell may be cancelled because the triggered LBT failure procedure in all BWPs on the serving cell are cancelled or all the invalid BWPs on the PCell are reconsidered as valid.

It is noted that when the LBT_COUNTER reaches lbt-FailureInstanceMaxCount for a serving cell during an ongoing RA procedure that is initiated on the serving cell, the UE may consider that consistent UL LBT failures are detected. In this case, the corresponding RA procedure may be considered by the UE unsuccessfully completed.

Condition 8: the UE determines an invalid BWP as a valid BWP if the timeAlignmentTimer expires In one example, the timeAlignmentTimer may be configured per timing advance group (TAG).

In one implementation, when the timeAlignmentTimer of a TAG expires, all the BWPs associated with the TAG and were considered invalid (e.g., consistent UL LBT failures are detected in those BWPs) may be reconsidered as valid and/or the BWP_declaration_counter (corresponding to those serving cells) may be reset to '0'. Moreover, the triggered LBT recovery procedure on the serving cells that associates with the TAG may be cancelled because the triggered LBT failure procedure in all BWPs on the serving cell are cancelled or all the invalid BWPs on the serving cells that associates with the TAG are reconsidered as valid.

Condition 9: The UE determines an invalid BWP as a valid BWP if an LBT failure MAC CE is transmitted In one implementation, when a MAC PDU includes a failure LBT MAC CE with a corresponding subheader, and the LBT failure MAC CE includes LBT failure-related information (e.g., an identification of the BWP/serving cell where consistent UL LBT failures are detected, or an identification of the serving cell where consistent UL LBT failures are detected), the BWP that is identified in this LBT failure MAC CE may be reconsidered as valid when the MAC PDU is transmitted.

In one implementation, when a MAC PDU includes a failure LBT MAC CE with a corresponding subheader, and the LBT failure MAC CE includes LBT failure-related information of one or multiple serving cells that has invalid BWPs (e.g., an identification of the one or multiple serving cells where consistent UL LBT failures are detected), all the invalid BWPs from the one or multiple serving cells may be reconsidered as valid when the MAC PDU is transmitted. Moreover, the triggered LBT recovery procedure(s) on the one or multiple serving cells may be cancelled because the triggered LBT failure procedure in all BWPs on the one or multiple serving cells are cancelled or all the invalid BWPs on the one or multiple serving cells are reconsidered as valid.

In one implementation, when a MAC PDU includes a failure LBT MAC CE with a corresponding subheader, and the LBT failure MAC CE includes LBT failure-related information (e.g., an identification of the BWP where consistent UL LBT failures are detected, or an identification of the serving cell where consistent UL LBT failures are detected), the BWP that is identified in this LBT failure MAC CE may be reconsidered as valid when the MAC PDU is transmitted and corresponding explicitly (DL) HARQ ACK or implicitly HARQ ACK is received from a network (e.g., an gNB) for a transport block (TB) carrying the MAC PDU.

In one example, a UE may consider that an implicit HARQ ACK is received from the network when the MAC PDU is transmitted via a configured UL grant resource (e.g., a PUSCH resource that corresponds to a configured grant configuration) and the configuredGrantTimer, which corresponds to the HARQ process Identity (ID) of the configured UL grant resource, expires.

In another example, a UE may consider that an implicit HARQ ACK is received from the network when the MAC PDU is transmitted via a dynamic UL grant resource (e.g., a PUSCH resource indicated via a dynamic uplink grant), specifically UL resource 1, and the network schedules another dynamic UL grant for new transmission (e.g., with a toggled New Data Indicator (NDI)) with the same HARQ process ID as UL resource 1.

Condition 10: the UE determines an invalid BWP as a valid BWP if the LBT recovery procedure is cancelled/stopped/suspended/failed/successful In some examples, the LBT recovery procedure may be triggered on a PCell, PSCell, or SCell.

In some examples, the LBT recovery procedure may be triggered when LBT_COUNTER>=lbt-FailureInstanceMaxCount.

In one implementation, when the LBT recovery procedure on a serving cell is cancelled/stopped/suspended/failed or considered successfully performed, all the BWPs that were determined as invalid BWPs (e.g., consistent UL LBT failures are detected in these BWPs) on the serving cell may be reconsidered as valid BWPs and/or the BWP_declaration_counter (corresponding to the serving cell) may be reset to '0'.

In some examples, the LBT recovery procedure on a serving cell (e.g., on the PCell/PSCell) may be stopped when a UE-initiated RA procedure that is initiated due to detection of consistent UL LBT failures, is stopped due to initiation of another RA procedure.

Condition 11: the UE determines an invalid BWP as a valid BWP if a MAC reset for the MAC entity corresponding to a serving cell is performed In some examples, MAC reset of a MAC entity may be requested by an upper layer (e.g., RRC layer). In some examples, a MAC entity may correspond to a cell group.

In one implementation, when a MAC reset is requested by an upper layer (e.g., RRC layer), all the BWPs that were determined as invalid BWPs (e.g., consistent UL LBT failures are detected in these BWPs) on the corresponding cell group may be reconsidered as valid BWPs and/or the BWP_declaration_counter(s) (corresponding to the cell group) may be reset to '0'. Moreover, the triggered LBT recovery procedure on the serving cells that corresponds to the cell group may be cancelled because the triggered LBT failure procedure in all BWPs on the serving cell that corresponds to the cell group are cancelled or all the invalid BWPs on the serving cells that corresponds to the cell group are reconsidered as valid.

Condition 12: the UE determines an invalid BWP as a valid BWP if an RLF procedure is triggered. In one example, an RLF procedure may be triggered on the PCell where consistent UL LBT failures are detected in all BWPs configured with PRACH occasions on the PCell In one implementation, after triggering an RLF procedure on the PCell, all the BWPs that are determined as invalid BWPs (e.g., consistent UL LBT failures are detected in those BWPs) on the PCell and/or MCG and/or SCG may be reconsidered as valid BWPs. Moreover, the triggered LBT recovery procedure(s) on the PCell and/or MCG and/or SCG may be cancelled because the triggered LBT failure procedure in all BWPs on the PCell and/or MCG and/or SCG are cancelled or all the invalid BWPs on the PCell and/or MCG and/or SCG are reconsidered as valid.

Alternatively, after triggering an RLF procedure on the PCell, all the BWPs on the PCell and/or MCG and/or SCG may be reconsidered as invalid BWPs.

In one example, after triggering an RLF procedure on the PCell, the BWP_declaration_counter (corresponding to the PCell) may be reset to '0'.

Condition 13: the UE Determines an Invalid BWP as a Valid BWP after Initiation of a procedure for reporting SCG failure information In one example, the procedure for reporting SCG failure information may be initiated as part of an LBT recovery procedure on the PSCell (e.g., consistent UL LBT failures are detected in a BWP on the PSCell and consistent UL LBT failures are detected in all BWPs configured with PRACH occasions in the PSCell).

In one implementation, after initiating a procedure to report SCG failure information as part of an LBT recovery procedure on the PSCell, all the BWPs that were determined as invalid BWPs on the PSCell and/or SCG may be reconsidered as valid BWPs. Moreover, the triggered LBT recovery procedure on the PSCell and/or SCG may be cancelled because the triggered LBT failure procedure in all BWPs on the PSCell and/or SCG are cancelled or all the invalid BWPs on the PSCell and/or SCG are reconsidered as valid.

Alternatively, after initiating a procedure to report SCG failure information as part of an LBT recovery procedure on the PSCell, all the BWPs on the PSCell and/or SCG may be reconsidered as invalid BWPs.

In one implementation, after initiating a procedure to report SCG failure information as part of an LBT recovery procedure on the PSCell, the BWP_declaration_counter (corresponding to the PSCell) may be reset to '0'.

Condition 14: the UE determines an invalid BWP as a valid BWP if the lbt-FailureDetectionTimer expires Condition 15: the UE determines an invalid BWP as a valid BWP when lbt-FailureDetectionTimer or lbt-FailureInstanceMaxCount is reconfigured by upper layers Condition 16: the UE determines an invalid BWP as a valid BWP if BWP_declaration_threshold is configured or reconfigured by an upper layer In one example, when the BWP_declaration_threshold (configured for a serving cell) is configured or reconfigured by an upper layer, the BWP_declaration_counter (corresponding to the serving cell) may be reset to '0'.

Condition 17: the UE determines an invalid BWP as a valid BWP if the UE does not perform a specific RA procedure A specific type of RA procedure may be referred to as a UE-initiated RA procedure (e.g., RA procedure initiated by a UE as part of an LBT recovery procedure on the PCell or PSCell).

In one implementation, when a UE receives a BWP switching command for a serving cell when the UE is not performing an RA procedure, all the invalid BWPs on the serving cell are reconsidered as valid BWPs and/or the BWP_declaration_counter (corresponding to the PCell) may be reset to '0'. The RA procedure may be performed as part of an LBT recovery procedure on the serving cell (e.g., PCell or PSCell). Moreover, the triggered LBT recovery procedure on the serving cell may be cancelled because the triggered LBT failure procedure in all BWPs on the serving cell are cancelled or all the invalid BWPs on the serving cell is reconsidered as valid.

In one implementation, when a UE receives a dynamic grant that indicates an UL resource in a BWP for a serving cell that was determined by the UE as invalid when the UE is not performing an RA procedure as part of an LBT recovery procedure on the serving cell, the UE may switch to the corresponding BWP and reconsidered this BWP as a valid BWP.

Timer-Based Approach

In one implementation, an invalid-BWP-timer may be applied, and maintained per BWP (or per cell). This invalid-BWP-timer defines a period during which a BWP is determined as an invalid BWP by a UE. In other words, when the invalid-BWP-timer is running, the corresponding BWP may be considered as an invalid BWP. When the invalid-BWP-timer expires or when the invalid-BWP-timer is stopped, the corresponding BWP may be reconsidered as a valid BWP and/or the BWP_declaration_counter may be set to '0'.

In one implementation, an invalid-BWP-timer may be applied, and maintained per cell. When the timer is running, the UE may not reconsider the BWP(s) of the cell as valid. When the timer expires, the UE may reconsider all the BWPs of the cell as valid and/or the BWP_declaration_counter may be set to '0'. Moreover, the triggered LBT recovery procedure on the serving cell may be cancelled because the triggered LBT failure procedure in all BWPs on the serving cell are cancelled or all the invalid BWPs on the serving cell is reconsidered as valid.

Specifically, a UE is restricted from performing UE-initiated BWP switching to an invalid BWP as part of an LBT recovery procedure on the PCell/PSCell. In other words, if a UE performs BWP switching due to consistent UL LBT failures on the PCell/PSCell, the UE may be restricted from switching to an invalid BWP.

Specifically, if a UE performs BWP switching due to consistent UL LBT failures on the PCell/PSCell, the UE may switch to a valid BWP configured with a PRACH occasion.

Furthermore, the invalid-BWP-timer may be started or restarted when one or multiple of the following conditions is satisfied:

Condition 1: the invalid-BWP-timer may be started or restarted if the UE triggers an LBT recovery procedure In one example, if an LBT recovery procedure is triggered due to detection of consistent UL LBT failures in a BWP, the invalid-BWP-timer corresponding to the BWP may be started or restarted.

In one example, if an LBT recovery procedure of a cell is triggered due to detection of consistent UL LBT failures in a BWP of the cell, the invalid-BWP-timer corresponding to the cell may be started or restarted. The invalid-BWP-timer may not be restarted while the invalid-BWP-timer is running.

Condition 2: the invalid-BWP-timer may be started or restarted if the UE considers consistent UL LBT failures as being detected for an active BWP In one example, when the UE determines consistent UL LBT failures for an active BWP, the invalid-BWP-timer corresponding to the BWP may be started or restarted.

In one example, when the UE detects consistent UL LBT failures for an active BWP of a cell, the invalid-BWP-timer corresponding to the cell may be started or restarted. The invalid-BWP-timer may not be restarted when the invalid-BWP-timer is running.

Condition 3: the invalid-BWP-timer may be started or restarted if the UE detects consistent UL LBT failures in a BWP In one example, when consistent UL LBT failures are detected in a BWP, the invalid-BWP-timer corresponding to the BWP may be started or restarted.

In one example, when consistent UL LBT failures are detected in a BWP of a cell, the invalid-BWP-timer corresponding to the cell may be started if the invalid-BWP-timer for the cell is not running.

Condition 4: the invalid-BWP-timer may be started or restarted if a UE performs BWP switching as part of an LBT recovery procedure (e.g., on a PCell/PSCell)

In one example, when consistent UL LBT failures are detected in a BWP (e.g., the BWP1), for a PCell/PSCell, a UE may switch to another BWP configured with a PRACH occasion and start or restart the invalid-BWP-timer corresponding to the BWP1.

In one example, when consistent UL LBT failures are detected in a BWP of a cell, specifically the BWP1, for a PCell/PSCell, a UE may switch to another BWP of the cell configured with a PRACH occasion and start the invalid-BWP-timer if the invalid-BWP-timer for the cell is not running.

Condition 5: the invalid-BWP-timer may be started or restarted if the UE initiates an RA procedure as part of an LBT recovery procedure In one example, when consistent UL LBT failures are detected in a BWP, specifically the BWP1, for a PCell/PSCell, a UE may switch to a new BWP configured with a PRACH occasion and initiates an RA procedure on the new BWP. Furthermore, the UE may start or restart the invalid-BWP-timer corresponding to the BWP1 during the RA procedure.

In one example, when consistent UL LBT failures are detected in a BWP, specifically the BWP1 of a cell, for a PCell/PSCell, a UE may switch to a new BWP of the cell configured with a PRACH occasion and initiates an RA procedure on the new BWP. Furthermore, the UE may start the invalid-BWP-timer if the invalid-BWP-timer for the cell is not running.

In addition to the (re)starting conditions mentioned above, whether the invalid-BWP-timer corresponding to a BWP is (re)started may be based on whether the BWP is pre-configured with a specific IE. The IE may be but is not limited to be configured by the network on per BWP basis. Via the IE, the gNB explicitly instructs the UE whether an invalid BWP can be reconsidered as a valid BWP when receiving a UL grant on the BWP.

The invalid-BWP-timer may be stopped when one or more following conditions are satisfied:

Condition 1: the invalid-BWP-timer may be stopped if the UE receives a BWP switching command from the network Specifically, the BWP switching command may be signaled via DCI message (e.g., signaled on PDCCH for BWP switching).

Specifically, the BWP switching command may be a dynamic grant that schedules an UL resource on another BWP.

In one example, when a UE receives a BWP switching command of a serving cell, the running invalid-BWP-timer(s) corresponding to the serving cell are stopped.

In one example, when a UE receives a BWP switching command to a BWP, the UE may stop the invalid-BWP-timer corresponding to the BWP if the invalid-BWP-timer is running.

Condition 2: the invalid-BWP-timer may be stopped if the UE switches BWP during an RA procedure due to no PRACH occasions configured on the current BWP Specifically, during an RA procedure initiated on a serving cell, a UE may switch to the BWP indicated by initialUplinkBWP if there is no PRACH occasions configured on the UE's current BWP of the serving cell.

In one example, when a UE switch to the BWP indicated by initialUplinkBWP of a serving cell during an RA procedure, the UE may stop the invalid-BWP-timer corresponding to the BWP, if invalid-BWP-timer is running.

In one example, when a UE switch to the BWP indicated by initialUplinkBWP of a serving cell during an RA procedure, all the invalid-BWP-timer(s) corresponding to the serving cell may be stopped, if the invalid-BWP-timer(s) is running.

Condition 3: the invalid-BWP-timer may be stopped if the UE switches BWP when bwp-InactivityTimer expires In one example, when the bwp-InactivityTimer associated with the active DL BWP expires, and the UE performs BWP switching to a BWP indicated by the defaultDownlinkBWP-Id or performs BWP switching to the initialDownlinkBWP, all the invalid-BWP-timer(s) corresponding to the serving cell may be stopped, if the invalid-BWP-timer(s) is running.

Condition 4: the invalid-BWP-timer may be stopped if the UE receives an indication that indicates a BWP is valid or to indicate all BWPs are valid, from a network In one example, the indication may be signaled via DCI message.

In one example, the indication may be signaled via MAC CE.

In one example, the indication may be signaled via RRC signaling.

In one example, the indication may include one or more valid BWPs (e.g., BWPs that a UE may reconsider as valid BWPs).

In one implementation, the network may indicate, via DCI message/MAC CE/RRC signaling, one or more BWPs that a UE may reconsider as valid BWPs. In this case, the network can identify which BWP(s) are considered invalid by the UE (e.g., the BWP(s) where consistent UL LBT failures are detected) prior to provide such an indication to the UE. when receiving the indication, all the invalid-BWP-timer(s) that corresponds to the BWP(s) indicated by the network may be stopped, if running.

Condition 5: the invalid-BWP-timer may be stopped if the UE receives an RRC (re-)configuration message In one example, an RRC (re-)configuration message may configure or reconfigure a BWP for a serving cell.

In one example, such an RRC (re-)configuration message may configure or reconfigure the firstActiveDownlinkBWP-Id and/or firstActiveUplinkBWP-Id for SpCell.

In one implementation, when the UE receives an RRC (re-)configuration message to configure or reconfigure a BWP for a serving cell, the invalid-BWP-timer corresponding to the BWP may be stopped, if running.

In one implementation, if the UE receives an RRC (re-)configuration message to configure or reconfigure a BWP for a serving cell, all the invalid-BWP-timer(s) corresponding to the serving cell may be stopped, if running.

Condition 6: the invalid-BWP-timer may be stopped if a serving cell is activated or deactivated In one implementation, an SCell may be deactivated when a sCellDeactivationTimer configured for the SCell expires.

In one implementation, an SCell may be activated or deactivated by a SCell Activation/Deactivation MAC CE.

In one implementation, when a serving cell is deactivated, all the invalid-BWP-timer(s) corresponding to the serving cell may be stopped, if running.

In one implementation, the BWP_declaration_counter (corresponding to a serving cell) may be set to zero when the serving cell (or the BWP) is activated (or deactivated).

Condition 7: the invalid-BWP-timer may be stopped if a specific type of RA procedure is completed It is noted that a specific type of RA procedure may be referred to a UE-initiated RA procedure (e.g., an RA procedure initiated by a UE as part of the LBT recovery procedure on a PCell or PSCell).

In one implementation, when an RA procedure initiated by the UE as part of the LBT recovery procedure (e.g., on a PCell/PSCell) is successfully completed, the UE may stop all the invalid-BWP-timer(s) corresponding to the cell.

Condition 8: the invalid-BWP-timer may be stopped if the "timeAlignmentTimer" expires In one example, the timeAlignmentTimer may be configured per TAG.

In one example, if a timeAlignmentTimer of a TAG expires, all the invalid-BWP-timer(s) corresponding to the BWPs that associated with the TAG, may be stopped, if running.

Condition 9: the invalid-BWP-timer may be stopped if the LBT recovery procedure is cancelled/stopped/suspended/failed or considered successful In one example, the LBT recovery procedure may be triggered on a PCell, PSCell, and SCell.

In one example, the LBT recovery procedure may be triggered if LBT_COUNTER>=lbt-FailureInstanceMaxCount.

In one implementation, when the LBT recovery procedure on a serving cell is cancelled/stopped/suspended/failed or considered successful, all the invalid-BWP-timer(s) corresponding to the serving cell may be stopped, if running.

Condition 10: the invalid-BWP-timer may be stopped if the lbt-FailureDetectionTimer expires Condition 11: the invalid-BWP-timer may be stopped if "lbt-FailureDetectionTimer" or "lbt-FailureInstanceMaxCount" is reconfigured by an upper layer Specifically, the invalid-BWP-timer, lbt-FailureInstanceMaxCount, BWP_declaration_threshold, or lbt-FailureDetectionTimer thereof may be configured by the network via RRC signaling. In one example, invalid-BWP-timer, lbt-FailureInstanceMaxCount, BWP_declaration_threshold, or lbt-FailureDetectionTimer thereof may be configured in an NRU-UplinkLbtFailureConfig IE. Moreover, an NRU-UplinkLbtFailureConfig IE may be configured per BWP/cell group/Cell/subset of cell group.

Specifically, the unit of the invalid-BWP-timer may be in milliseconds, slots, symbols, etc.

Interaction Between RA Procedure and UL LBT Failure

In one implementation, when consistent UL LBT failures are detected in a BWP of a serving cell (e.g., LBT_COUNTER reaches lbt-FailureInstanceMaxCount for a BWP of serving cell) during an RA procedure that is initiated on the serving cell, it implies that consistent UL LBT failures are detected (on the serving cell). In this case, the RA procedure may be considered unsuccessfully completed. Moreover, the MAC entity may indicate an RA problem to the RRC layer. Subsequently, the RRC layer may set the failureType as randomAccessProblem. Thus, the UE may transmit an RRC message (e.g., SCG Failure Information message) including the failureType to the gNB.

BWP Switching and LBT Recovery Procedure

When a UE-initiated BWP switching is performed by a UE, the UE may switch to a BWP that was determined as an invalid BWP (e.g., consistent UL LBT failures are detected in the BWP). Some conditions may be required in order to avoid UE-initiated BWP switching to an invalid BWP.

In one example, a UE-initiated BWP switching may be performed when BWP-InactivityTimer (and the UE is operated in TDD mode) expires.

In one example, a UE-initiated BWP switching may be performed during an RA procedure if the UE's current BWP are not configured with PRACH occasion.

In one implementation, the BWP-InactivityTimer may be stopped when one or multiple of the following conditions are satisfied:

Condition 1: if an LBT recovery procedure is triggered

In one embodiment, an LBT recovery procedure may be triggered for a serving cell when consistent UL LBT failures are detected in a BWP (e.g., LBT_COUNTER reaches lbt-FailureInstanceMaxCount for the corresponding BWP) of the serving cell (e.g., SpCell or SCell).

Condition 2: if "NRU-UplinkLbtFailureConfig" is configured

Specifically, the invalid-BWP-timer, lbt-FailureInstanceMaxCount, BWP_declaration_threshold, or lbt-FailureDetectionTimer may be configured in NRU-UplinkLbtFailureConfig.

Condition 3: if a specific BWP has been determined as an invalid BWP by the UE

In one embodiment, a specific BWP may be a BWP indicated by initialUplinkBWP.

In one example, a specific BWP may be a BWP that is in the same frequency range as the DL BWP indicated by defaultDownlinkBWP and the UE is operated in TDD mode.

In one example, a specific BWP may be a BWP which is in the same frequency range as the DL BWP indicated by initialDownlinkBWP and the UE is operated in TDD mode.

Condition 4: if the invalid-BWP-timer is running

Condition 5: if the BWP_declaration_counter is not '0'

In one example, the UE may not switch its DL BWP if the BWP-InactivityTimer expires.

In another example, the UE may not switch to a default BWP/initial BWP that is considered as invalid BWP even if the BWP-InactivityTimer expires.

Completion of LBT Recovery Procedure

A UE (or MAC entity) may be configured with an LBT failure detection procedure (per serving cell) and LBT recovery procedure (per serving cell). Consistent UL LBT failures may be detected per BWP of a serving cell (as part of the LBT recovery procedure of the serving cell) by counting LBT failure indications, for all UL transmissions, from the lower layer (e.g., PHY layer) to the MAC entity.

An LBT recovery procedure on a SpCell may be triggered by a UE when the UE detects consistent UL LBT failures in a BWP of the SpCell according to the LBT failure detection procedure of the SpCell (e.g., when LBT_COUNTER reaches lbt-FailureInstanceMaxCount for the corresponding BWP of the SpCell).

In one implementation, a UE may only perform one LBT recovery procedure at a time. For example, if a first serving cell has detected consistent UL LBT failures, the UE may trigger an LBT recovery procedure for the serving cell. Meanwhile, if a second serving cell has detected consistent UL LBT failures, the UE may not trigger another LBT recovery procedure (i.e., an LBT recovery procedure on the second serving cell).

In other implementations, the LBT recovery procedure may be triggered per serving cell. For example, if a first serving cell has detected consistent UL LBT failures, the UE may trigger a first LBT recovery procedure, and if a second serving cell has detected consistent UL LBT failures, the UE may trigger a second LBT recovery procedure. More specifically, the first LBT recovery procedure and the second LBT recovery procedure may be performed simultaneously.

Subsequently, the LBT recovery procedure may be determined/considered as completed or cancelled, by a UE, if one or more or any combination of the following conditions are satisfied:

Condition 1: if an RA procedure that is initiated as part of the LBT recovery procedure on a SpCell is successfully performed.

In one example, if an LBT recovery procedure on a SpCell is triggered by a UE, the UE may initiate an RA procedure as part of the LBT recovery procedure. Subsequently, the UE may consider the LBT recovery procedure as completed or cancelled if the RA procedure is successfully completed.

Condition 2: if an LBT failure MAC CE is transmitted

In one example, a UE may transmit an LBT failure MAC CE as part of the LBT recovery procedure on a SpCell.

In one example, the LBT failure MAC CE may identify the BWP(s) and/or cells where consistent UL LBT failures are detected.

In one example, the LBT failure MAC CE may identify the BWP(s) and/or cells where an LBT failure procedure is triggered.

In one example, the LBT failure MAC CE may be transmitted via an UL resource allocated on a serving cell where LBT recovery procedure is not triggered or be transmitted via any available UL resource without restriction.

In one example, the LBT failure MAC CE may include the LBT information (e.g., BWP ID and/or cell ID) of all (or part of) the BWP(s) (or serving cell(s)) that indicated LBT failure(s) prior to the MAC PDU assembly carrying the LBT failure MAC CE (with a corresponding subheader).

When the UE instructs the Multiplexing and Assembly procedure to generate the LBT failure MAC CE, the UE may perform the Multiplexing and assembly procedure (including Logical Channel prioritization procedure). During the multiplexing and assembly procedure, the UE may multiplex the generated MAC CE(s) and/or MAC SDU(s) in a MAC PDU. Then, the UE may transmit the MAC PDU (e.g., via a UL-SCH resource). More specifically, MAC PDU assembly may happen at any point in time between UL grant reception and actual transmission of the corresponding MAC PDU.

In one example, when an LBT recovery procedure on a SpCell is triggered by a UE, the UE may transmit an LBT failure MAC CE as part of the LBT recovery procedure on a SpCell. Subsequently, the UE may consider the LBT recovery procedure on a SpCell as completed or cancelled if an LBT failure MAC CE is transmitted (and this MAC CE includes (all the) indicated LBT failure(s) (on all the cells) prior to the assembly of the MAC PDU carrying the LBT failure MAC CE).

Condition 3: if a positive response corresponding to the transmitted LBT failure MAC CE is received from the network In one example, a positive response may be explicitly indicated from the network or implicitly received by the UE. If a positive response is received by the UE, it implies that the network successfully receives the LBT failure MAC CE from the UE. Specifically, the UE may transmit an LBT failure MAC CE as part of an LBT recovery procedure on a SpCell.

In one example, the LBT failure MAC CE may be transmitted on a first UL resource (if UL resources are available for a new transmission and the first UL resources may accommodate the LBT failure MAC CE with a corresponding subheader as a result of logical channel prioritization) via the first HARQ process. After the transmission of the first UL resource via the first HARQ process, the UE may receive a positive response from the network for the first HARQ process, where the positive response may be a PDCCH (addressed to C-RNTI) indicating UL grant for a new transmission for this HARQ process (for LBT failure MAC CE transmission).

In one example, a positive response may be an explicit DL HARQ feedback from the network (e.g., an explicit DL HARQ ACK), which indicates the HARQ process of an UL transmission that includes an LBT failure MAC CE is successfully received.

In one example, a positive response may be implicitly received by a UE when receiving an (dynamic) UL grant for new transmission (e.g., with toggled NDI), whereas the (dynamic) UL grant corresponds to the same HARQ process ID as the UL resource where an LBT failure MAC CE is transmitted.

In one example, a positive response may be implicitly received by a UE when a specific timer expires. For example, the specific timer may be started or restarted when the LBT failure MAC CE is transmitted.

In one implementation, when an LBT failure MAC CE is transmitted on a configured UL grant resource (e.g., a PUSCH resource that corresponds to a configured grant configuration), the positive response may be implicitly received by the UE that transmitted the LBT failure MAC CE. For example, upon expiration of a configuredGrant-Timer for the HARQ process of a configured UL grant resource (e.g., a PUSCH resource that corresponds to a configured grant configuration) via which the LBT failure MAC CE is transmitted.

Specifically, the configured grant configuration may be but is not limited to be a configured grant Type 1/configured grant Type 2 configuration.

In one implementation, if an LBT failure MAC CE was transmitted on a Msg 3 (e.g., transmitted on a PUSCH resource scheduled by a RAR, which corresponds to an RA procedure initiated as part of the LBT recovery procedure), the positive response may be an explicit HARQ ACK from the network, e.g., a PDCCH address to C-RNTI (that contains an UL grant for new transmission) indicated by the network while the ra-ContentionResolutionTimer is running.

In one implementation, if an LBT recovery procedure on a SpCell is triggered by a UE, the UE may transmit an LBT failure MAC CE. Subsequently, the UE may consider the LBT recovery procedure as completed or cancelled upon reception of a positive response (e.g., implicit or explicit ACK) corresponding to the transmitted LBT failure MAC CE.

An LBT recovery procedure on a SCell may be triggered by a UE when the UE detects consistent UL LBT failures in a BWP of the SCell according to the LBT failure detection procedure for the SCell (e.g., LBT_COUNTER reaches lbt-FailureInstanceMaxCount for the corresponding BWP of the SCell). Subsequently, the LBT recovery procedure may be determined as completed or cancelled, by the UE, if one or more following conditions are satisfied:

Condition 1: if an LBT failure MAC CE is transmitted

In one example, the LBT failure MAC CE may include an identification of the BWP where consistent UL LBT failures are detected, or an identification of the serving cell where consistent UL LBT failures are detected.

In one example, the LBT failure MAC CE may include the LBT information (e.g., BWP ID and/or cell ID) of all (or part of) the BWP(s) (or serving cell(s)) that indicated LBT failure (s) prior to the MAC PDU assembly carrying the LBT failure MAC CE (with a corresponding subheader).

In one example, the LBT failure MAC CE may be transmitted via an UL resource allocated on a serving cell where the LBT recovery procedure is not triggered or be transmitted via any available UL resource without restriction.

If the UE instructs the Multiplexing and Assembly procedure to generate the LBT failure MAC CE, the UE may perform the Multiplexing and assembly procedure (including Logical Channel prioritization procedure). During the multiplexing and assembly procedure, the UE may multiplex the generated MAC CE(s) and/or MAC SDU(s) in a MAC PDU. Then, the UE may transmit the MAC PDU (e.g., via a UL-SCH resource). More specifically, MAC PDU assembly may happen at any point in time between UL grant reception and actual transmission of the corresponding MAC PDU.

In one example, if an LBT recovery procedure on a SCell is triggered by a UE, the UE may transmit an LBT failure MAC CE as part of the LBT recovery procedure. Subsequently, the UE may consider the LBT recovery procedure on the SCell is completed if an LBT failure MAC CE is transmitted (and this MAC CE includes all the indicated LBT failure(s) (on the SCell) prior to the assembly of the MAC PDU carrying the LBT failure MAC CE).

More specifically, if there are multiple LBT recovery procedures are ongoing, the UE may consider an LBT recovery procedure is completed based on whether LBT information (e.g., BWP ID and/or cell ID) for a BWP and/or a cell where the LBT recovery procedure is triggered is included in the LBT failure MAC CE.

Condition 2: if a positive response corresponding to the transmitted LBT failure MAC CE is received from the network In one example, a positive response may be explicitly indicated from the network or implicitly received by the UE. If a positive response is received by the UE, it implies the network has successfully received the LBT failure MAC CE that is transmitted by the UE as part of the LBT recovery procedure on the SCell.

In one example, the LBT failure MAC CE may be transmitted on a first UL resource (if UL resources are available for a new transmission and the first UL resources may accommodate the LBT failure MAC CE with a corresponding subheader as a result of logical channel prioritization) via the first HARQ process. After the transmission of the first UL resource via the first HARQ process, the UE may receive a positive response from the network for the first HARQ process, where the positive response may be a PDCCH (addressed to C-RNTI) indicating UL grant for a new transmission for this HARQ process (used for LBT failure MAC CE transmission).

In one example, a positive response may be an explicit DL HARQ feedback from the network (e.g., an explicit DL HARQ ACK), which indicates the HARQ process of an UL transmission that includes an LBT failure MAC CE is successfully received.

In one example, a positive response may be implicitly received by a UE when receiving an (dynamic) UL grant for new transmission (e.g., with toggled NDI), whereas the (dynamic) UL grant corresponds to the same HARQ process ID as the UL resource via which an LBT failure MAC CE is transmitted.

In one example, a positive response may be implicitly received by a UE when a specific timer expires. For example, the specific timer may be started or restarted when the LBT failure MAC CE is transmitted.

In one example, when an LBT failure MAC CE is transmitted on a configured UL grant resource (e.g., a PUSCH resource that corresponds to a configured grant configuration), the positive response may be implicitly received by the UE that transmitted the LBT failure MAC CE. For example, upon expiration of a configuredGrant-Timer for the HARQ process of a configured UL grant resource (e.g., a PUSCH resource that corresponds to a configured grant configuration) via which the LBT failure MAC CE is transmitted.

Specifically, the configured grant configuration may be but is not limited to be a configured grant Type 1/configured grant Type 2 configuration.

In one example, when an LBT failure MAC CE is transmitted on a Msg 3 (e.g., transmitted on a PUSCH resource scheduled by a RAR), the positive response may be an explicit HARQ ACK from the network (e.g., a PDCCH address to C-RNTI that contains an UL grant for new transmission) indicated by the network while the ra-ContentionResolutionTimer is running.

In one example, when an LBT recovery procedure on a SCell is triggered by a UE, the UE may transmit an LBT failure MAC CE. Subsequently, the UE may consider the LBT recovery procedure on the SCell as completed or cancelled upon reception of a positive response (e.g., implicit or explicit ACK) corresponding to the transmitted LBT failure MAC CE.

More specifically, if there are multiple LBT recovery procedures are ongoing, the UE may consider a LBT recovery procedure for a BWP and/or a serving cell is completed based on whether the positive response for a LBT failure MAC CE that includes LBT information for the BWP and/or the serving cell is received.

Condition 3: if a BWP switching is performed on a SCell where consistent UL LBT failures are detected In one example, the UE may switch to a BWP when receiving a PDCCH indicating a DL assignment or an UL grant from the network.

In one example, a BWP may be switched by a UE upon the expiration of bwp-InactivityTimer.

In one example, the UE may switch to a BWP during an RA procedure (if PRACH occasions are not configured for the active BWP).

In one example, if a LBT recovery procedure on a SCell is triggered by a UE (e.g., the UE detects consistent UL LBT failures in a BWP of the SCell), the UE may consider the LBT recovery procedure as completed or cancelled when the UE performs BWP switching on the SCell. It is noted that the UE may reset LBT_COUNTER when performing BWP switching.

Condition 4: if an UL transmission is (successfully) performed on a SCell where the LBT recovery procedure is triggered.

In one example, an UL transmission may be performed on an UL resource (e.g., PUSCH resource) indicated via RAR, dynamic UL grant (e.g., PDCCH), configured grant, etc.

In one example, the UL resource may be RACH resource, PUCCH resource, and/or PUSCH resource. The UL resource may be scheduled by dynamic grant (e.g., via PDCCH) and/or configured by RRC (e.g., configured grant type 1/configured grant type 2 or pre-configured in RRC configuration).

In one example, the UE may consider an UL transmission is (successfully) performed if the MAC entity of the UE does not receive a LBT failure indication from PHY layer (for the UL transmission), or if the MAC entity receives a LBT success indication from PHY layer (for the UL transmission).

In one example, if a LBT recovery procedure on a SCell is triggered by a UE (e.g., the UE detects consistent UL LBT failures in a BWP of the SCell), the UE may consider the LBT failure detection procedure as completed or cancelled when an UL transmission is (successfully) performed on the SCell.

It is noted that when the UE considers an LBT recovery procedure (for a BWP and/or a serving cell (e.g., an SpCell or a SCell)) is completed, the UE may reset the LBT_COUNTER (corresponding to the BWP and/or the serving cell), and/or reset the BWP_declaration_counter (corresponding to the BWP and/or the serving cell).

In one example, when the BWP_declaration_counter is reset, the UE may cancel the triggered LBT failure procedure for the BWP and/or the serving cell.

Conditions to Reset the LBT_COUNTER

The LBT_COUNTER (corresponding to a BWP and/or a serving cell) may be reset if one or more following conditions are satisfied:

Condition 1: After/when triggering an LBT failure procedure (by the corresponding BWP and/or serving cell)

In one example, if an LBT failure procedure is triggered for a BWP and/or a serving cell, the LBT_COUNTER that corresponds to the BWP and/or the serving cell may be reset. Moreover, the serving cell may be a SpCell and/or a SCell.

In one example, an LBT failure procedure may be triggered for a BWP and/or a serving cell when consistent UL LBT failures are detected in the BWP and/or the serving cell (e.g., if LBT_COUNTER>=lbt-FailureInstanceMaxCount).

More specifically, the LBT_COUNTER is set to '0'.

Condition 2: After an UL resource becomes available for transmission (on the corresponding BWP and/or serving cell)

In one example, an UL resource may be indicated via RAR, dynamic UL grant (e.g., PDCCH), configured grant, etc.

In one example, an UL resource may be considered available if the UL resource is sufficient to accommodate an LBT failure MAC CE (with a corresponding subheader).

In one example, an UL resource may be considered available if the UL resource is allowed to be used for the transmission of an LBT failure MAC CE.

In one example, an UL resource may be considered available if the UL resource is allocated on a serving cell and/or BWP where no consistent UL LBT failure is detected or where a serving cell and/or BWP where an LBT recovery procedure is triggered.

In one example, when a UE receives an UL resource on a serving cell, whereas the UL resource is available for the transmission of an LBT failure MAC CE, the UE may reset the LBT_COUNTER(s) that corresponds to the BWP(s) and/or the serving cell(s) which trigger the LBT failure procedure(s).

Condition 3: if the MAC entity instructs the Multiplexing and Assembly procedure to generate an LBT failure MAC CE In one example, an LBT failure MAC CE may include LBT information of all (or part of) the BWP(s) (or serving cell(s)) that indicated LBT failure(s) prior to the assembly of the MAC PDU containing the LBT failure MAC CE (with a corresponding subheader).

In one example, when a MAC entity instructs the Multiplexing and Assembly procedure to generate an LBT failure MAC CE and this MAC CE includes LBT information of all BWP(s) or serving cell(s) that indicated LBT failure(s) prior to the assembly of the MAC PDU containing the MAC CE (with a corresponding subheader), the UE may reset the LBT_COUNTER(s) that corresponds to the BWP(s) and/or the serving cell(s) that indicated LBT failure (s) prior to the MAC PDU assembly.

Condition 4: cancellation of the triggered LBT failure procedure(s)

In one example, when the UE cancels the triggered LBT failure procedure(s) on one or more serving cells, the UE may reset the LBT_COUNTER(s) that corresponds to those serving cell(s).

In one example, when the UE cancels the triggered LBT recovery procedures on one or more serving cells, the UE may reset the LBT_COUNTER(s) that corresponds to those serving cell(s).

In one example, when the UE cancels the triggered LBT failure procedure of a serving cell (e.g., the UE cancels a triggered LBT failure procedure of all the BWPs of the serving cell and/or reconsiders all the invalid BWPs of the serving cell as valid BWPs), the UE may reset the LBT_COUNTER that corresponds to the serving cell.

Condition 5: a positive response corresponding to the transmitted LBT failure MAC CE is received from the network In one example, when the UE receives a positive response corresponding to the transmitted LBT failure MAC CE (for a BWP and/or a serving cell) from the network, the UE may reset the LBT_COUNTER(s) (that corresponds to those BWP(s) and/or serving cell (s)).

Figure 4:
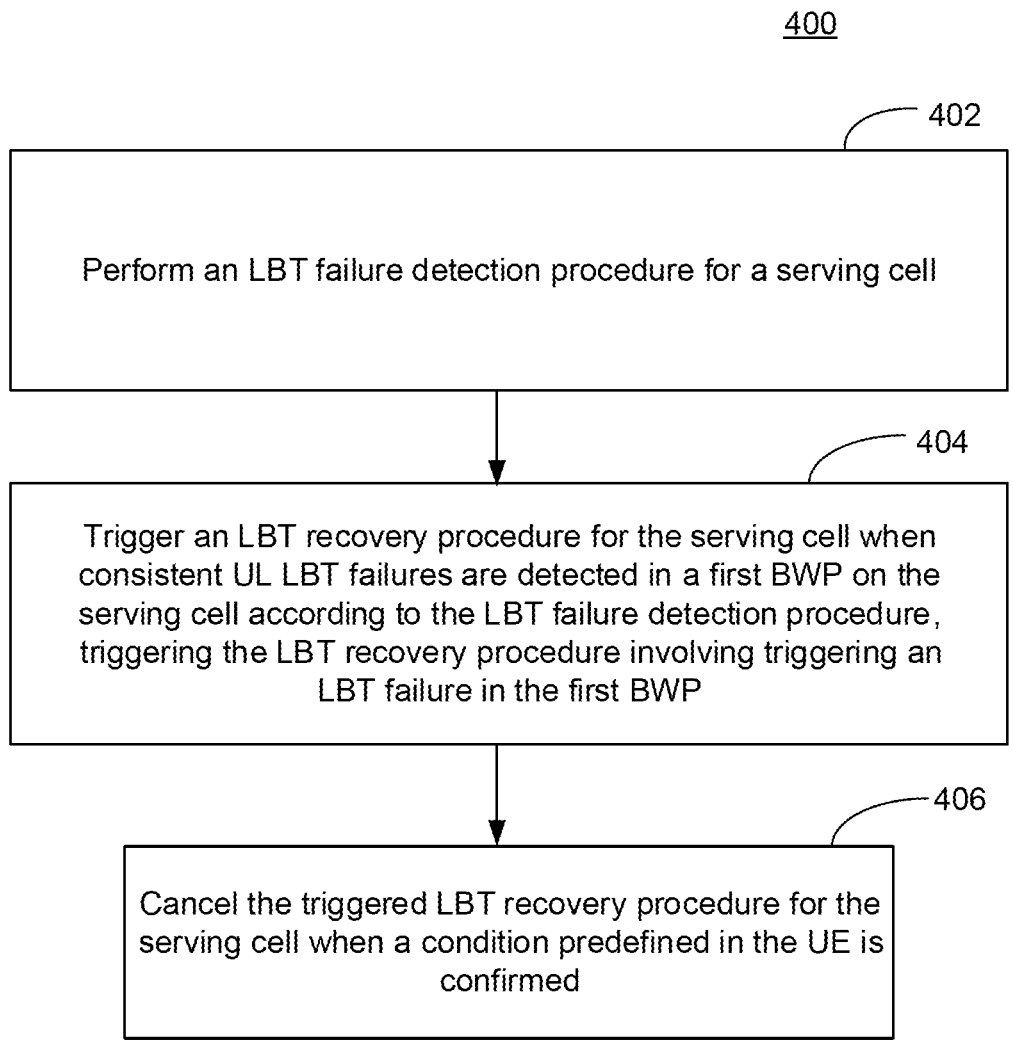
FIG. 4 is a flowchart illustrating a method for an LBT recovery procedure, according to an implementation of the present disclosure.

FIG. 4 is a flowchart illustrating a method 400 for an LBT recovery procedure, according to an implementation of the present disclosure. In action 402, the UE may perform an LBT failure detection procedure for a serving cell. In action 404, the UE may trigger an LBT recovery procedure for the serving cell when consistent UL LBT failures are detected in a first BWP on the serving cell according to the LBT failure detection procedure, triggering the LBT recovery procedure may involve triggering an LBT failure procedure in the first BWP. In action 406, the UE may cancel the triggered LBT recovery procedure for the serving cell when a condition predefined in the UE is confirmed.

It is noted that the condition for the UE to cancel the triggered LBT recovery procedure for the serving cell may include at least one of the following:

(1) a PDCCH that instructs the UE to perform a BWP switching for the serving cell is received by the UE;

(2) a PDCCH that instructs the UE to perform a BWP switching on the serving cell is received by the UE and an RA procedure for the serving cell not being performed by the UE;

(3) an RRC configuration or reconfiguration message to configure or reconfigure a BWP switching on the serving cell is received by the UE;

(4) a MAC reset for a MAC entity corresponding to the serving cell is performed by the UE;

(5) the serving cell is deactivated or activated;

(6) an RA procedure for the LBT recovery procedure on the serving cell is performed by the UE and the RA procedure is successfully completed on the serving cell; and (7) a LBT failure MAC CE is transmitted by the UE, and the LBT failure MAC CE indicates at least one cell where the LBT recovery procedure is triggered.

(8) all the triggered LBT failure procedures on the serving cell have been cancelled (e.g., the triggered LBT failure procedures on all the BWPs of the serving cell have been cancelled).

(9) all the invalid BWPs on the serving cell have been reconsidered as valid.

In the LBT recovery procedure, the UE may transmit, to a network, an LBT failure MAC CE that indicates one or multiple serving cell(s) which has indicated LBT failure. The LBT failure MAC CE may be transmitted on the serving cell or on another serving cell that has not triggered LBT recovery procedure. Moreover, the UE may switch from the first BWP to a second BWP on the serving cell when the LBT failure procedure is not triggered in the second BWP on the serving cell and the second BWP being configured with PRACH occasion, and/or may initiate an RA procedure for the second BWP on the serving cell.

It is noted that the UE may initiate an RA procedure for the triggered LBT recovery procedure in the second BWP on the serving cell if the serving cell is a SpCell.

In one example, the serving cell may be a SpCell including at least one of a PCell or a PSCell, or the serving cell is a SCell.

In one implementation, the UE may transmit, to the network, an LBT failure MAC CE indicating that LBT failure has been triggered on the serving cell. Moreover, the LBT failure MAC CE may be transmitted on the same cell if the serving cell is a SpCell (e.g., the LBT failure MAC CE may be transmitted on the SpCell if an LBT failure procedure has been triggered on the SpCell).

In one implementation, the UE may transmit, to the network, an LBT failure MAC CE indicating that the LBT failure has been triggered on the serving cell. Moreover, the LBT failure MAC CE may be transmitted on another cell that has not indicated LBT failure if the serving cell is a SCell (e.g., the LBT failure MAC CE may be transmitted on another cell that has not indicated LBT failure if a LBT failure procedure has been triggered on the SCell).

In one implementation, the UE may switch from the first BWP to the second BWP on the serving cell if the serving cell is a SpCell.

In one implementation, the UE may initiate an RA procedure for the second BWP on the serving cell if the serving cell is a SpCell.

Moreover, the UE may reset an LBT counter (e.g., LBT_COUNTER) corresponding to the serving cell when the triggered LBT recovery procedure is cancelled. The LBT_COUNTER of the serving cell is incremented by the UE when an UL LBT failure is detected on the serving cell by the LBT failure detection procedure of the serving cell. In one example, the UE may set the LBT_COUNTER of the serving cell to zero when cancelling the triggered LBT recovery procedure for the serving cell.

Figure 5:
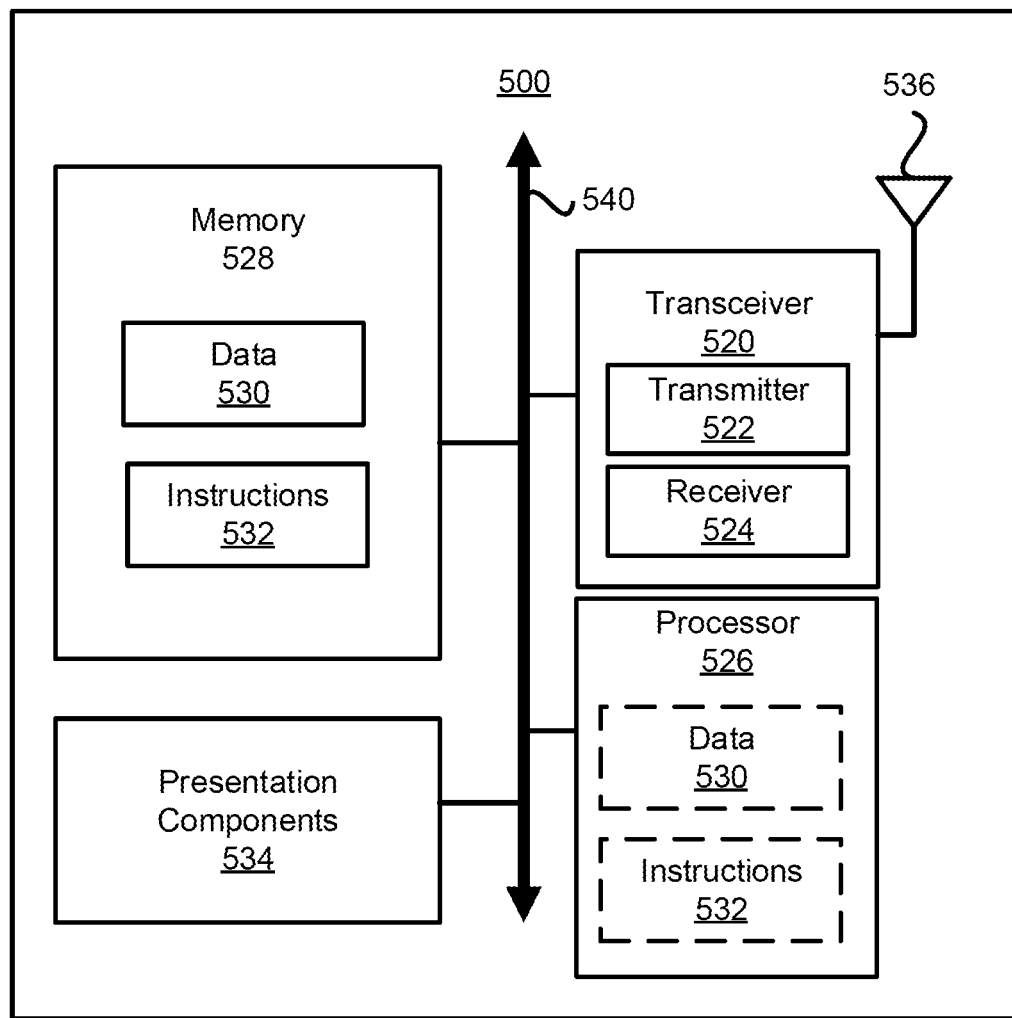
FIG. 5 is a block diagram illustrating a node for wireless communication, according to an implementation of the present disclosure.

FIG. 5 is a block diagram illustrating a node 500 for wireless communication according to an implementation of the present disclosure.

As illustrated in FIG. 5, the node 500 may include a transceiver 520, a processor 526, a memory 528, one or more presentation components 534, and at least one antenna 536. The node 500 may also include a Radio Frequency (RF) spectrum band module, a BS communications module, a network communications module, and a system communications management module, input/output (I/O) ports, I/O components, and a power supply (not illustrated in FIG. 5). Each of these components may be in communication with each other, directly or indirectly, over one or more buses 540. The node 500 may be a UE or a BS that performs various disclosed functions illustrated in FIG. 4.

The transceiver 520 may include a transmitter 522 (with transmitting circuitry) and a receiver 524 (with receiving circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any media that can be accessed by the node 500 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 528 may include computer-storage media in the form of volatile and/or non-volatile memory. The memory 528 may be removable, non-removable, or a combination thereof. For example, the memory 528 may include solid-state memory, hard drives, optical-disc drives, etc. As illustrated in FIG. 5, the memory 528 may store computer-readable and/or computer-executable instructions 532 (e.g., software codes) that are configured to, when executed, cause the processor 526 (e.g., processing circuitry) to perform various disclosed functions. Alternatively, the instructions 532 may not be directly executable by the processor 526 but may be configured to cause the node 500 (e.g., when compiled and executed) to perform various disclosed functions.

The processor 526 may include an intelligent hardware device, a central processing unit (CPU), a microcontroller, an ASIC, etc. The processor 526 may include memory. The processor 526 may process the data 530 and the instructions 532 received from the memory 528, and information through the transceiver 520, the baseband communications module, and/or the network communications module. The processor 526 may also process information to be sent to the transceiver 520 for transmission via the antenna 536, to the network communications module for transmission to a CN.

One or more presentation components 534 may present data to a person or other devices. Presentation components 534 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of a listen before talk (LBT) recovery procedure performed by a user equipment (UE), the method comprising:
    performing an LBT failure detection procedure for a serving cell;
    triggering the LBT recovery procedure for a first bandwidth part (BWP) of the serving cell in response to detecting consistent uplink (UL) LBT failures in the first BWP of the serving cell via the LBT failure detection procedure, the LBT recovery procedure comprising triggering an LBT failure procedure for the first BWP for determining the first BWP as an invalid BWP; and
    cancelling the triggered LBT recovery procedure for the first BWP of the serving cell in response to confirming a predefined condition in the UE is met,
    wherein the LBT recovery procedure further comprises:
        transmitting an LBT failure medium access control (MAC) control element (CE) indicating that the LBT failure procedure is triggered for the serving cell to a network on the serving cell in a case that the serving cell is a Special Cell (SpCell), or transmitting the LBT failure MAC CE to the network on another serving cell on which no LBT failure procedure is triggered in a case that the serving cell is a Secondary Cell (SCell);
        switching from the first BWP to a second BWP of the serving cell in response to no LBT failure procedure being triggered for the second BWP and the second BWP being configured with a physical random access channel (PRACH) resource in a case that the serving cell is the SpCell; and
        initiating a random access procedure on the second BWP of the serving cell in a case that the serving cell is the SpCell.

2. The method of claim 1, wherein the predefined condition comprises one of:
    a physical downlink control channel (PDCCH) that indicates to the UE to perform BWP switching on the serving cell is received by the UE;
    the PDCCH that indicates to the UE to perform the BWP switching on the serving cell is received by the UE and a second random access procedure on the serving cell is not performed by the UE;
    a radio resource control (RRC) configuration or reconfiguration message to configure or reconfigure the BWP switching on the serving cell is received by the UE;
    a MAC reset for a MAC entity corresponding to the serving cell is performed by the UE;
    the serving cell is deactivated or activated;
    the random access procedure for the LBT recovery procedure on the serving cell is performed by the UE and the random access procedure is successfully completed on the serving cell; and
    the LBT failure MAC CE is transmitted by the UE, the LBT failure MAC CE indicating at least one cell for which the LBT recovery procedure is triggered, the at least one cell including the serving cell for which the LBT recovery procedure is triggered.

3. The method of claim 1, further comprising:
    resetting an LBT counter corresponding to the serving cell in response to the cancellation of the triggered LBT recovery procedure; and
    incrementing the LBT counter by the UE when an LBT failure is detected on the serving cell via the LBT failure detection procedure.

4. The method of claim 3, wherein resetting the LBT counter comprises setting the LBT counter to zero when cancelling the triggered LBT recovery procedure for the serving cell.

5. The method of claim 1, wherein the serving cell is the SpCell including at least one of a Primary Cell (PCell) or a Primary Secondary Cell Group (SCG) Cell (PSCell), or the serving cell is the SCell.

6. A user equipment (UE) for performing a listen before talk (LBT) recovery procedure, the UE comprising:
- at least one processor; and
- at least one non-transitory computer-readable medium coupled to the at least one processor and storing computer-executable instructions that, executed by the at least one processor, cause the UE to:
- perform an LBT failure detection procedure for a serving cell;
- trigger the LBT recovery procedure for a first bandwidth part (BWP) of the serving cell in response to detecting consistent uplink (UL) LBT failures in the first BWP of the serving cell via the LBT failure detection procedure, the LBT recovery procedure comprising triggering an LBT failure procedure for the first BWP for determining the first BWP as an invalid BWP; and
- cancel the triggered LBT recovery procedure for the first BWP of the serving cell in response to confirming a predefined condition in the UE is met,
- wherein the LBT recovery procedure further comprises:
  - transmitting an LBT failure medium access control (MAC) control element (CE) indicating that the LBT failure procedure is triggered for the serving cell to a network on the serving cell in a case that the serving cell is a Special Cell (SpCell), or transmitting the LBT failure MAC CE to the network on another serving cell on which no LBT failure procedure is triggered in a case that the serving cell is a Secondary Cell (SCell);
  - switching from the first BWP to a second BWP of the serving cell in response to no LBT failure procedure being triggered for the second BWP and the second BWP being configured with a physical random access channel (PRACH) resource in a case that the serving cell is the SpCell; and
  - initiating a random access procedure on the second BWP of the serving cell in a case that the serving cell is the SpCell.

7. The UE of claim 6, wherein the predefined condition comprises one of:
- a physical downlink control channel (PDCCH) that indicates to the UE to perform BWP switching on the serving cell is received by the UE;
- the PDCCH that indicates to the UE to perform the BWP switching on the serving cell is received by the UE and a second random access procedure on the serving cell is not performed by the UE;
- a radio resource control (RRC) configuration or reconfiguration message to configure or reconfigure the BWP switching on the serving cell is received by the UE;
- a MAC reset for a MAC entity corresponding to the serving cell is performed by the UE;
- the serving cell is deactivated or activated;
- the random access procedure for the LBT recovery procedure on the serving cell is performed by the UE and the random access procedure is successfully completed on the serving cell; and
- the LBT failure MAC CE is transmitted by the UE, the LBT failure MAC CE indicating at least one cell for which the LBT recovery procedure is triggered, the at least one cell including the serving cell for which the LBT recovery procedure is triggered.

8. The UE of claim 6, wherein the computer-executable instructions, when executed by the at least one processor, further cause the UE to:
- reset an LBT counter corresponding to the serving cell in response to the cancellation of the triggered LBT recovery procedure; and
- increment the LBT counter by the UE when an LBT failure is detected on the serving cell via the LBT failure detection procedure.

9. The UE of claim 8, wherein resetting the LBT counter comprises setting the LBT counter to zero when cancelling the triggered LBT recovery procedure for the serving cell.

10. The UE of claim 6, wherein the serving cell is the SpCell including at least one of a Primary Cell (PCell) or a Primary Secondary Cell Group (SCG) Cell (PSCell), or the serving cell is the SCell.

* * * * *